July 26, 1949.    K. A. SWANSTROM    2,477,430
LOCKING NUT AND METHOD OF MANUFACTURING THE SAME
Filed June 24, 1943    4 Sheets-Sheet 2
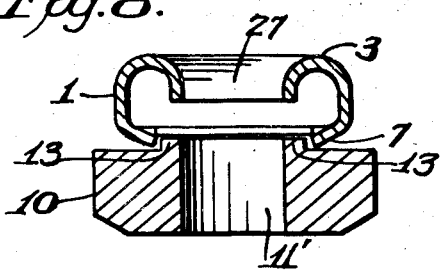
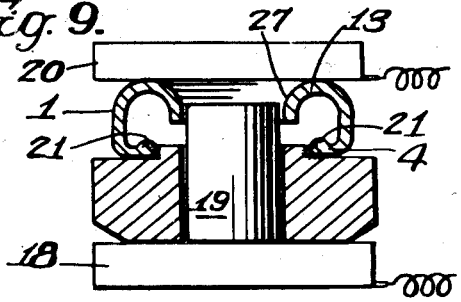
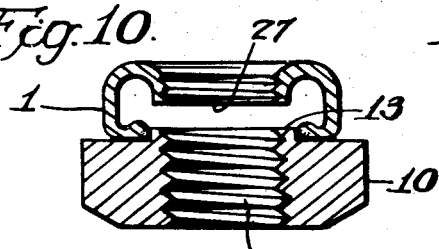
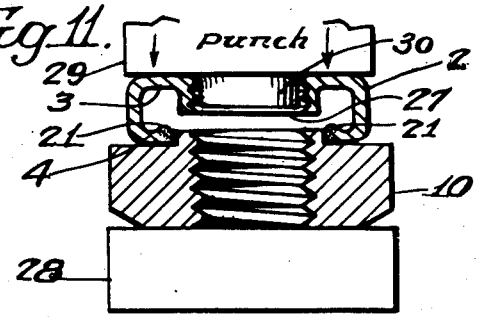
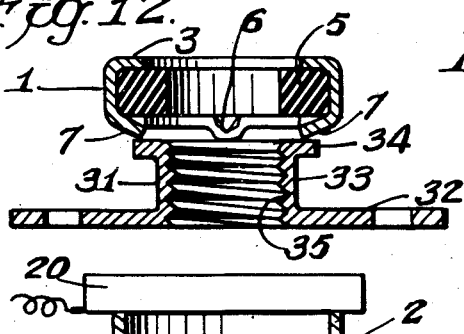
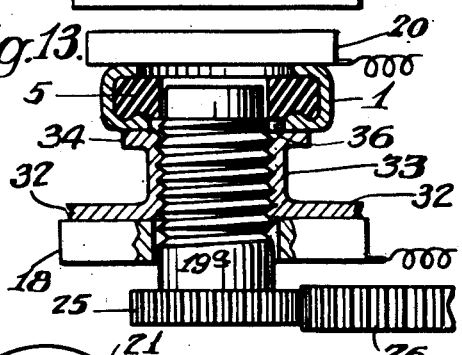
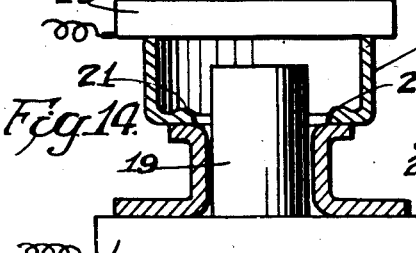
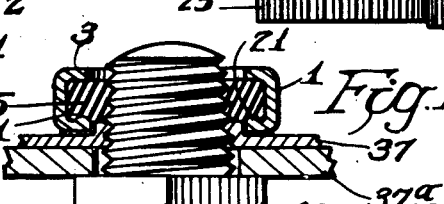
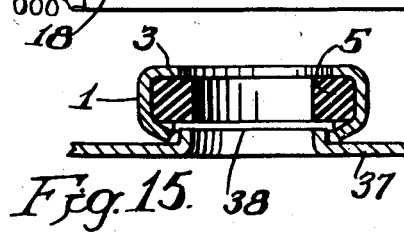
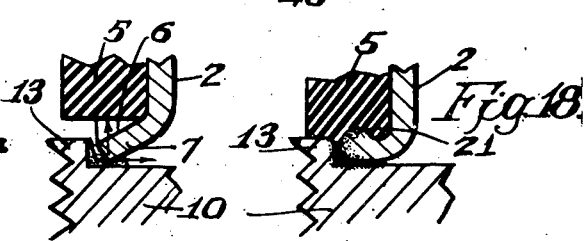
INVENTOR.
Klas Arent Swanstrom
BY
ATTORNEY.

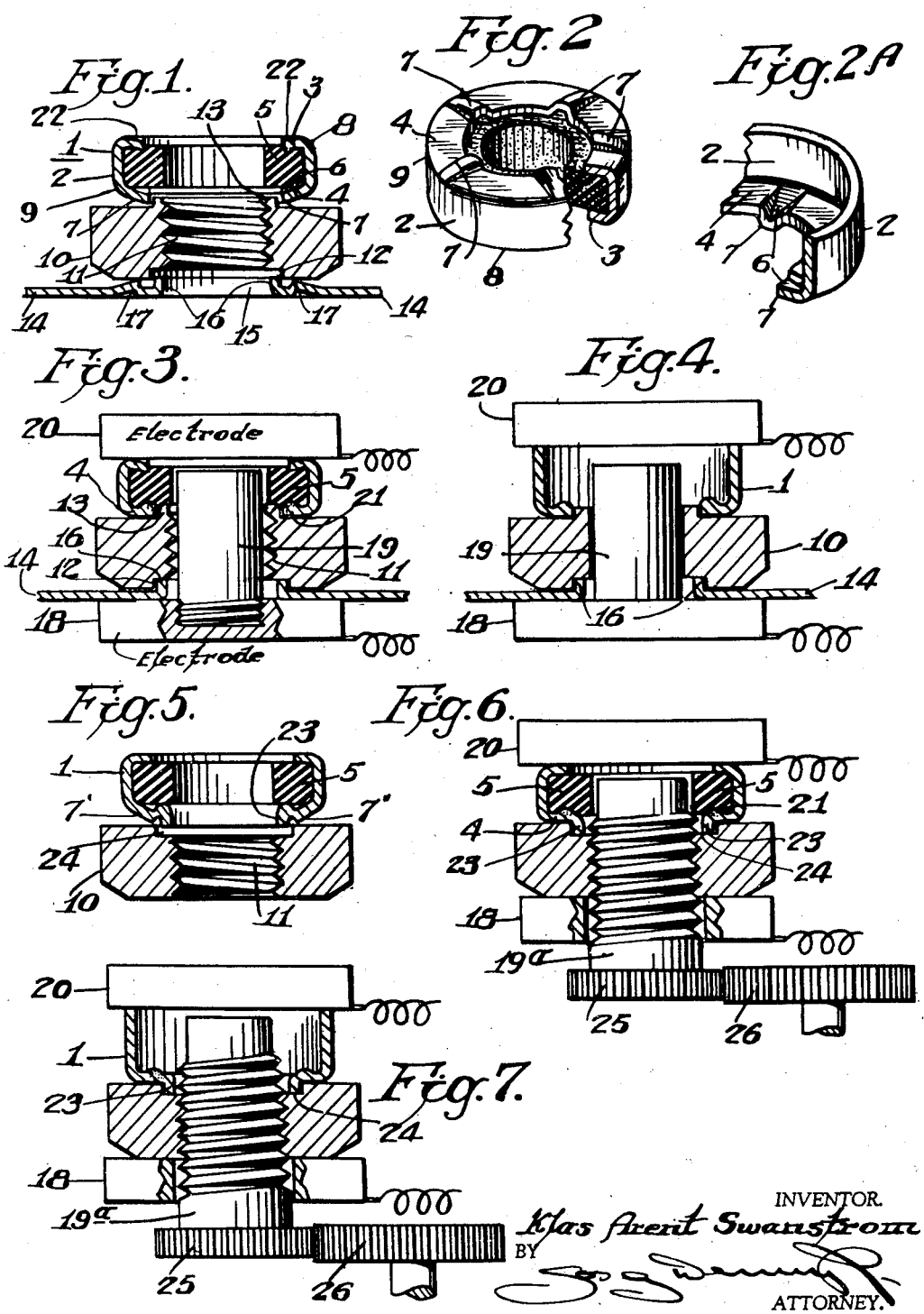

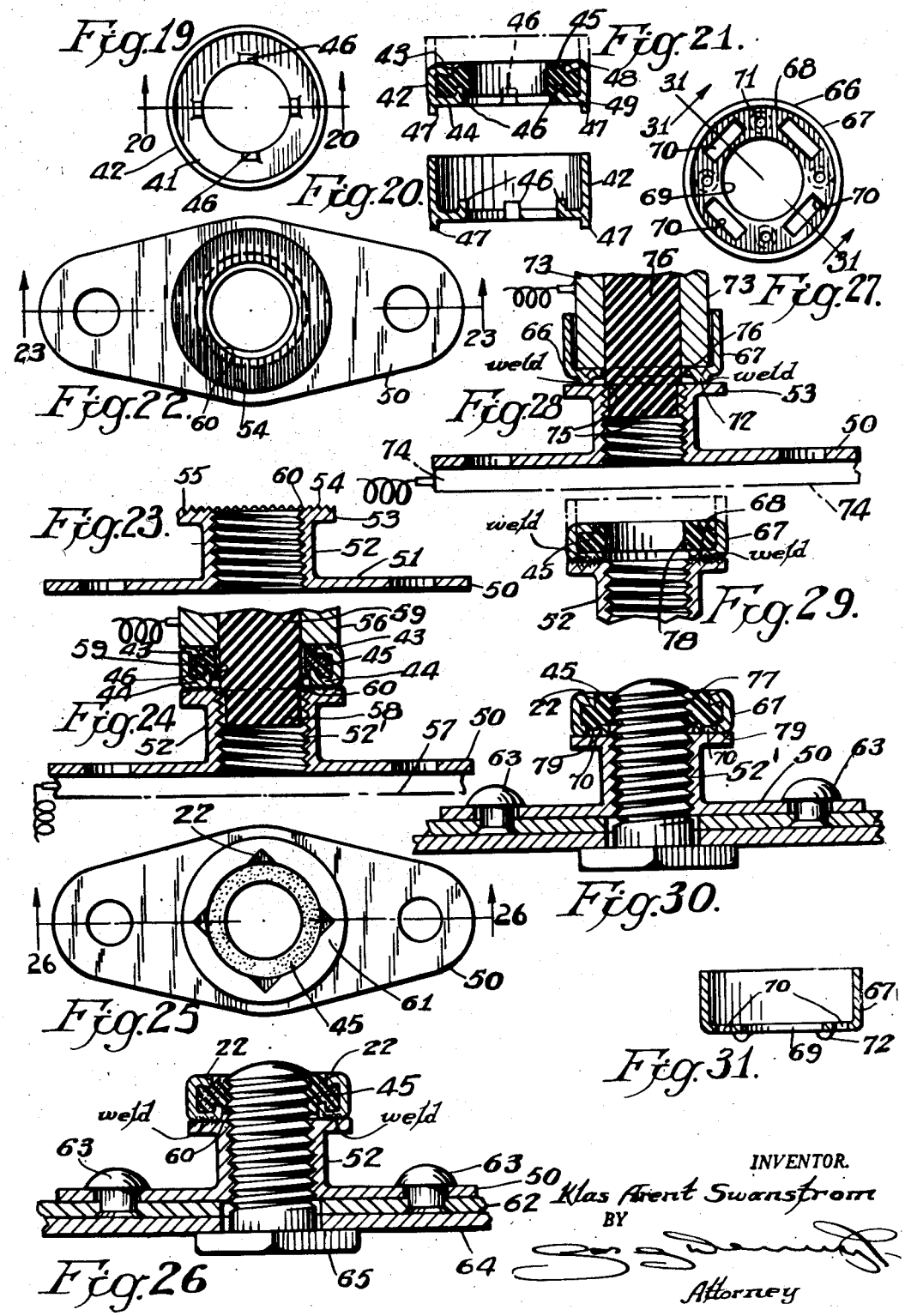

July 26, 1949.    K. A. SWANSTROM    2,477,430
LOCKING NUT AND METHOD OF MANUFACTURING THE SAME
Filed June 24, 1943    4 Sheets-Sheet 4
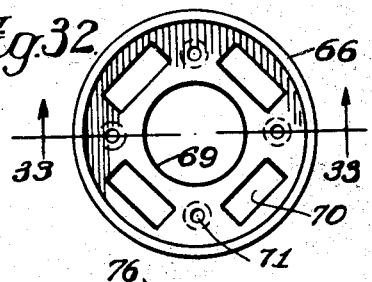
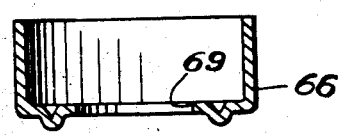
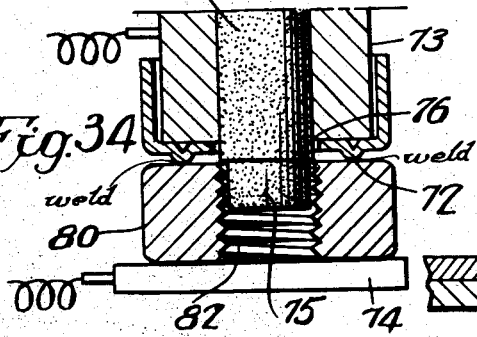
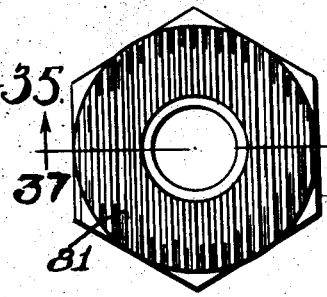
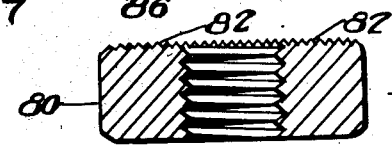
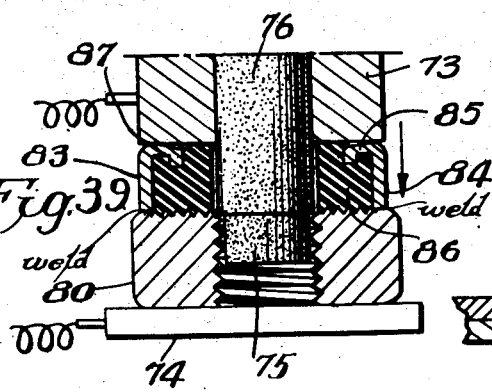
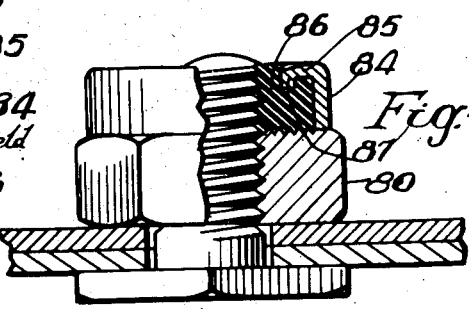
INVENTOR.
Klas Arent Swanstrom
BY
Attorney Patented July 26, 1949

2,477,430

UNITED STATES PATENT OFFICE 2,477,430

LOCKING NUT AND METHOD OF
MANUFACTURING THE SAME

Klas Arent Swanstrom, Buckingham Township,
Bucks County, Pa.

Application June 24, 1943, Serial No. 492,004

9 Claims. (Cl. 151—7)

My invention is an improved locking nut having a threaded load bearing member or nut body and a locking collar connected through a holder with the body and axially biasing a bolt threaded through such body to maintain the load bearing surfaces of the threads of the bolt and body in nonfrictional contact. My invention also involves the method of manufacturing such locking nuts with minimum wastage of metal and without appreciable deterioration of the grain structure thereof.

Locking nuts of the general type to which my invention relates have been heretofore machined from solid stock, but such manufacture entails great wastage of metal; the production rate is relatively slow even when the major operations are performed on automatic screw machines; and the body and collar-holder are necessarily of the same metal instead of being made of different metals appropriate to the respective functions of such members. Attempts have also been made to manufacture locking nuts of the type to which my invention relates by integrally drawing a load bearing body and collar-holder from sheet metal, but such locking nuts have proven objectionable because of their failure to securely hold the locking collar and the impairment of the metal grain and structure by the excessive working of the metal in the various drawing operations and the maldistribution of the thickness of the metal without regard to the work to be performed by the various portions of the nut. Efforts have even been made to manufacture nuts of the general type to which my invention relates by spot-welding together a load bearing body and a collar-holder having an outwardly flaring base, but such efforts have hitherto proven impracticable for commercial manufacture.

In the preferred embodiment of my invention, the collar-holder comprises a shell having a peripheral axial wall and inwardly extending radial end walls forming a channel or radially concave or substantially scotia cross section. Such holder is secured by resistance-welding to a load bearing element or nut body through gradual melting of welding projections or bridges, and solidification of the melt under pressure. The welding projections are preferably so tapered outward from the holder that the welding current and heat are initially concentrated in small areas in contact with the load bearing member and body heating of the holder and load bearing member is minimized or obviated.

The melt from the welding projections is excluded from the bore of the load bearing member by a barrier in or around such bore and such barrier may be used as a pilot for aligning the axial centers of the bore and holder. Preferably the barriers are formed by complementary annular ribs and grooves on the load bearing members and holders, or vice versa, or by a nonconducting stud projecting through the bore of the body into the holder, or vice versa. The provision of a ledge, free from pressure, on the surface of the load bearing member surrounding its bore may, however, provide a sufficient barrier to ingress of the melt into the bore, particularly when the welding projections are disposed radially to the center of the bore and tapered so that their points nearest the bore initially make contact with the body, melt and solidify, and the projections melting progressively outward toward the periphery of the holder.

The locking collar held by the holder preferably consists of a hardened cellulose ring, such as laminated fibre impregnated with a resinous condensation product. The collar contains a bore having an unthreaded wall. The diameter of the bore is preferably intermediate the minimum and maximum diameters of the rib and groove of the thread formed by the wall of the bore of the load bearing member. The external diameter of the collar should be ample to allow staking surfaces between the bore and periphery of the collar and permit impression of threads on the bore wall without splitting apart the fibre laminae.

The ring may be inserted in the holder before or after the welding of the load bearing element thereto, and the ring is spaced from the load bearing member by the welded wall of the holder.

The ring may be held against rotation by stakes formed by the melt on the inner surface of the radial welded wall of the holder or otherwise. The top or radial wall of the holder opposite the welded wall may also be staked to further retard rotation of the collar and prevent shearing stresses between the laminations thereof: such final staking being preferably done after the welding has been completed.

A locking collar integral with the outer radial wall of the holder may be used in lieu of a collar staked to the holder. Such integral collar is preferably formed by drawing a flange inwardly from the inner edge of the radial outer shell wall and threading such flange with a thread having the same pitch as the thread of the load bearing member. The outer radial wall is then bent axially beyond its elastic limit by a blow or pressure so as to place the threads of the collar or flange normally out of phase with the thread of the load bearing member.

By my improvements there is provided a locking collar-holder which may be rapidly and inexpensively drawn from sheet metal by available machinery without impairment of the grain structure of the metal, which is maintained substantially continuous from edge to edge of the shell. The walls of the holder are of substantially uniform thickness, excepting at the corners, and the surfaces thereof are substantially devoid of scratches or cuts tending to cause fatigue cracks or fractures under vibration. The thinned walls at the corners of the holder between the radial and axial walls thereof permit bending and indentation of the outer radial wall to provide staking, reconditioning or adjustment of the locking collar without bulging of the axial cylindrical wall of the holder or the transmission of stresses to the load bearing member, with consequent avoidance of distortion of the threads thereof, particularly when the load bearing member is drawn from sheet metal.

The holder provided in accordance with my invention provides broad radial bearing surfaces for locking collars of the fibre type so that such collars cannot be popped out of the holder by pressure or vibration. The interposition of the welded wall of the holder between the locking collar and the threaded wall of the load bearing member permits the peripheral portion of the locking collar to be so tightly gripped between such welded wall and the complementary radial wall of the holder that rotation of the collar is retarded and absorption of moisture through the peripheral wall of the collar is prevented. The portion of the collar projects inward beyond the welded wall of the holder and is not so tightly compacted and hence readily receives a thread imprint from the bolt, which may, in certain forms of my invention, make a partial rotation of the bolt tip after leaving the thread of the load bearing member and before engaging and slightly bulging the locking collar. Such spacing of the collar axially from the body allows unimpeded recoil of the locking collar to bias the bolt axially when it has impressed a thread in the collar and the driving force on the bolt has been slackened or released. Such spacing further permits the reconditioning of nuts having worn collars by pressing the outer radial wall of the holder and the fibre collar axially toward the nut body so as to throw the threads impressed in the collar out of phase with the threads of the load bearing member.

Where heavy duty locking nuts are used on shipboard, in agriculture or under other conditions causing rapid corrosion, the thin walled collar-holders of usual locking nuts deteriorate much more rapidly than the solid or heavy walled bodies of such nuts when both are made of the same steel. It is generally prohibitively costly to make locking nuts entirely of corrosion-resisting metal and if body and holder are both thin walled there is lack of load sustaining capacity. In accordance with my improvements, the load bearing elements of such nuts may be made solid or thick walled from relatively inexpensive, tough steel best adapted for load bearing and the collar-holder may be made of thin walled corrosion resisting steel, such as stainless steel, with resulting durability for the nut as a whole equal to the life of the heavy walled or solid body.

When the load bearing element of my improved locking nut is made by drawing sheet metal, the stock used may be of such quality and thickness, in excess of the thickness of the collar-holder, as is appropriate to the load to be sustained, and the base, shank and head of the body may be drawn from sheet steel without excessive working or impairment of the grain of the metal, since no cup-forming expansion of the top of the shank is required. The head or top flange of the load bearing member of my improved locking nut may be, and preferably is, made of smaller diameter than the outer diameter of the collar-holder to be attached thereto so as to provide greater resilience in the collar-holder and less tendency for the transmission of stresses from the collar-holder to the shank of the load bearing element, with consequent avoidance of distortion of the threads therein.

The characteristic features and advantages of my improvements will further appear from the accompanying drawings of illustrative embodiments of my invention and the following description thereof.

In the drawings, Fig. 1 is an exploded vertical sectional view through a base, load bearing body, locking collar and collar-holder positioned for incorporation in a locking nut in accordance with my invention; Fig. 2 is an enlarged inverted perspective, partly in section, of the holder or shell shown at the top of Fig. 1; Fig. 2a is a fragmentary view illustrating the indentation of the bottom of the shell to form welding projections on the bottom thereof; Fig. 3 is a diagrammatic vertical sectional view of welding electrodes having between them members shown in Fig. 1 after the bonding of such members together by the melting of the welding projections thereon by their resistance of an electric current; Fig. 4 is a diagrammatic vertical part sectional view showing welding electrodes having between them a partially formed nut having the body and collar-holder welded together before the insertion of the locking collar; Fig. 5 is an exploded vertical sectional view of modified body and locking members positioned for embodiment in a nut in accordance with my invention; Fig. 6 is a diagrammatic part sectional view of welding electrodes and a pilot having mounted thereon the members of Fig. 5 welded together by the melting of welding projections; Fig. 7 is a diagrammatic vertical sectional view similar to Fig. 6 but illustrating the welding of body and holder members before the insertion of a collar in the holder; Fig. 8 is a vertical sectional view of a modified locking collar and holder positioned for attachment to a body similar to that shown in Fig. 4; Fig. 9 is a diagrammatic vertical part sectional view illustrating the welding together of the elements of Fig. 8; Fig. 10 is a vertical sectional view illustrating the threading of the nut body and locking collar shown in Fig. 9; Fig. 11 is a diagrammatic vertical part sectional view illustrating the axial displacements of the collar of Fig. 10 relatively to the body so as to put the threads of such elements out of "phase"; Fig. 12 is a vertical sectional view of the collar and holder of Fig. 1 positioned for attachment to a drawn sheet metal body or load bearing member; Fig. 13 is a diagrammatic vertical part sectional view illustrating the welding together of the body and holder elements shown in Fig. 12 in accordance with my invention; Fig. 14 is a vertical sectional view illustrating the welding of a holder such as shown in Fig. 4 to an unthreaded drawn sheet metal body before the threading of the latter; Fig. 15 is a vertical sectional view showing the locking collar and holder of Fig. 1 positioned for attachment to an apertured plate having a lip thereon; Fig. 16 is a vertical sectional view showing a plate formed from the elements of Fig. 15 in conjunction with a structural member and attaching bolt; Figs. 17 and 18 are exaggerated diagrammatic detail views illustrating the welding of a body and holder by the melting of a welding projection on the latter and the solidification of the parts to bond the members together and form a stake for a locking collar; Fig. 19 is a top plan view of a cup for forming a modified form of locking collar-holder; Fig. 20 is a transverse sectional view taken on the line 20—20 of Fig. 19; Fig. 21 is a transverse section of a locking collar housed in a holder made from the cup shown in Figs. 19 and 20; Fig. 22 is a top plan view of a drawn sheet metal anchor body similar to that shown in Fig. 12 but having a striated head; Fig. 23 is a transverse sectional view taken on the line 23—23 of Fig. 22; Fig. 24 is a diagrammatic transverse part sectional view of welding electrodes and a pilot with the elements of Figs. 19 to 23 thereon after the welding of such elements; Fig. 25 is a top plan view of the locking nut shown in Fig. 24 after the indentation of the top of the holder to "stake" the locking collar; Fig. 26 is a transverse sectional view taken on the line 26—26 of Fig. 25; Fig. 27 is a top plan view of a further modified form of cup for making a locking collar holder; Fig. 28 is a diagrammatic transverse part sectional view illustrating welding electrodes and a pilot with the cup of Fig. 27 and a body similar to that shown in Fig. 12 mounted in position for welding; Fig. 29 is a fragmentary transverse sectional view showing the cup of Fig. 27 with one end welded on a body head and the other end turned over a locking collar; Fig. 30 is a transverse sectional view of the anchor nut formed from the elements of Figs. 27 to 29 in conjunction with a bolt and members attached by the bolt and anchor nut; Fig. 31 is a transverse sectional view taken on the line 31—31 of Fig. 27; Fig. 32 is a top plan view and Fig. 33 is a transverse sectional view of a cup similar to that shown in Fig. 1 but suitable for attachment to a nut having a solid, as distinguished from a sheet metal body; Fig. 34 is a transverse, sectional view showing the assembly of the holder of Fig. 33 on a plain, solid, hexagonal nut between welding electrodes; Fig. 35 is a pplan view of a solid, hexagonal nut having a striated surface to which locking nut holders of various types may be welded; Fig. 36 is a transverse sectional view of a locking nut embodying the holder of Figs. 32, 33 and 34 and the body of Figs. 34 or 35, together with a bolt and members secured by the bolt and nut; Fig. 37 is a transverse, sectional view taken on the line 37—37 of Fig. 35; Fig. 38 is a transverse sectional view of a locking collar mounted in a further modified form of holder; Fig. 39 is a diagrammatic, transverse, part sectional view showing the assembly of the collar and holder of Fig. 38 on the nut of Figs. 35 and 37 in cooperative relationship with welding electrodes; and Fig. 40 is a part sectional elevation of the nut made in accordance with Fig. 39 assembled with a bolt to secure two members together.

In the embodiments of my invention illustrated in Figs. 1-3, 12, 13, 15-18, a sheet metal blank, preferably of stainless or corrosion resisting steel, is cut and drawn to form a collar holder 1 comprising a shell having a peripheral cylindrical wall 2 and apertured radial walls 3 and 4 extending inwardly from opposite ends thereof to form an annular channel of radially concave or substantially scotia cross section. An apertured elastic collar 5, preferably formed of hard laminated fibre, has its peripheral portion seated in the channel of the shell. Preferably the collar 5 is seated in the shell while the latter is in the cup form shown in Fig. 2a and the top of the wall 2 is then turned over to form the wall or disk 3. The peripheral portion of the collar 5 is thereby tightly gripped and compacted by the radial walls 3 and 4, while the inner portion of the collar, surrounding its aperture, projects inward beyond such walls and is free from compaction thereby.

The inner surface of the disk 4 has stamped therein triangular indentations 6 which produce radial tapering ribs 7 on the outer surface of the disk. The ribs 7 gradually increase in depth between the periphery and the axial aperture of the disk 4 and form welding projections which concentrate current flow and heat to effect progressive and substantially uniform melting of the ribs from the edge of the aperture to the periphery of the disk 4.

The walls 2, 3 and 4 are of substantially uniform thickness except at the thinned corners 8 and 9 by which such walls are connected. The grain of the metal lies parallel with the surfaces of the walls 2, 3 and 4 and, except where interrupted by the ribs 7, is substantially continuous and unbroken from the inner edge of the disk 3 to the inner edge of the disk 4. The holder 1 and collar 5 constitute a preferred embodiment of the locking element of my improved locking nut.

In the embodiments of my invention illustrated in Figs. 1-11, the load bearing element comprises a polygonal solid body member 10 containing an axial aperture whose wall forms the load bearing thread 11. Such thread may be tapped before or after the attachment together of the load carrying and locking elements.

As shown in Figs. 1 to 4, the body 10 has a counterbore 12 around one end of its axial aperture and a rib or barrier 13 around the other end thereof. As shown in Figs. 8-11 the chamfer 12 may be omitted but the rib 13 retained.

Preferably the grain of the metal from which the nut body 10 is formed extends substantially parallel with the axis of the nut body.

To provide a locking nut having a solid body with an enlarged foot, it may have attached to its chamfered end a sheet metal base 14 containing an aperture 15 surrounded by an upturned lip or flange 16 adapted to register with the chamfer 12, as shown in Figs. 1 to 4. Radial ribs 17, similar to the ribs 7, may be formed in the upper surface of the plate 14 by indenting the lower surface thereof to provide welding projections.

In the practice of my method of making locking nuts illustrated in Figs. 1 to 3, the base 14, body 10 and holder 1, with the collar 5 clamped therein, are assembled in superposed relation upon a flat welding electrode 18 of an electric welding machine with the ribs 13 and 16 interlocked respectively in the axial aperture of the disk 4 and in the chamfer 12 to axially align the nut elements. Such alignment and interlocking may be facilitated by a pilot 19 seated in the electrode 18 and composed of non-conducting material. A complementary flat welding electrode 20 is pressed against the disk 3, and a welding current thereupon flows between the electrodes 18 and 20. The resistance of the contacting points of the ribs 7 and 17 to current flow causes the heating and melting of such ribs progressively outwardly (Figs. 17 and 18) and the solidification of such melt bonds together securely the elements 1, 10 and 14 (Fig. 3).

The melt is effectively excluded from the bore of the body 10 by the ribs 13 and 16, but tends to flow outwardly and upwardly through apertures left in the disk 4 by the melting of the rib 7 to burn sockets in the collar 5 and form on cooling protuberances or stakes 21 interlocked in such sockets (Figs. 3, 18).

The rib 13 may, if desired, be made of sufficient height and serrated to engage and interlock with the bottom of the collar 5, when the elements 1 and 10 are in their final position. To further secure the collar 5 against rotation, the disk 4 may be punched inward to form stakes or tines 22 penetrating into the collar 5. Such staking may be done before or after the welding together of the body 10 and holder 1. Stresses caused by such stake punching are taken up by the thin shoulder 8 and bulging of the wall 2 or transmission of distorting stresses to the threads 11 are thereby prevented or minimized.

As illustrated in Fig. 4, the base 14, body 10 and holder cup 1 may be assembled and welded together before the body 10 has been threaded or before a collar 5 is seated in the holder 1 and the disk 3 turned over from the cylindrical wall section 2. In such case the exclusion of any melt from the bore of the body 10, as previously described, permits subsequent threading of the body without damaging the tap. After the body 10 has been threaded, a collar 5 is inserted in the cup and the upper portion of the peripheral wall 2 thereof turned over to form an apertured disk 3. The disk 3 may then be indented to form stakes 22 and hold the collar 5 against rotation.

In the embodiment of my invention illustrated in Figs. 5 to 7, inclusive, a holder 1 has the inner portion of its radial wall 4 bent axially to form an annular lip or rib 23, and the body 10 is provided with a complementary chamfer or countersink 24, into which the lip 23 fits and interlocks when the holder and body are welded together by the melting and solidification of radial tapering ribs 7', as previously described. Ordinarily the interlocked rib 23 and groove 24 effectively exclude any melt from the thread 11. The rib 23 is preferably spaced radially from the thread 11 so as to leave at the bottom of the groove 24 a ledge free from welding pressure. To insure complete exclusion of the melt from the threads 11, when very high welding pressures are used, it is sometimes desirable to provide a rotary threaded pilot 19a which passes through the electrode and may be rotated automatically by means of a pinion 25 and gear 26. The thread of the pilot 19a meshes with the thread 11 and completely fills the bore and thread before the welding current passes.

The holder 1 may be welded to the body 10 after a collar 5 is secured in the holder, as illustrated in Figs. 5 and 6, or before the insertion of a collar 5 in the holder cup as illustrated in Fig. 7.

Figs. 8 to 11, inclusive, illustrate the application of my invention to a fibreless locking nut in which the locking effect is imparted by an elastic collar integral with the holder and having threads out of phase with the load carrying thread of the body.

In this embodiment of my invention, the load bearing element or body 10 is provided with a rib 13 surrounding the top of the axial bore having an unthreaded wall 11'. A holder 1 has the inner portion of its radial wall or outer disk 3 bent inward to form a lip or depending collar 27. The body 10 and holder 1 are registered with one another by the interlocking of the rib 13 in the axial apertures of the cup disk 4 or by a non-conducting pilot 19 supported by the electrode 18 and extending upward in close slip fit relationship with the bore of the body and the bore of the depending collar 27. The radial wall 4 of the holder is welded to the body by the melting of the ribs 7 by current passing between the electrodes 18 and 20 and solidification of the melt, as before described.

When the body 10 and holder 1 have been welded together, the wall 11' and the inner wall of the depending collar 27 are threaded by a tap or threading tool passed consecutively through one after the other, so as to provide a thread of like pitch and phase in both elements, as shown in Fig. 10. The welded unit is then subjected to pressure or a blow between the anvil 28 and punch 29 having a pilot 30 filling the collar 27 so that the bend between the walls 2 and 3 of the holder 1 is stressed beyond its elastic limit sufficiently to place the threads in the collar 27 out of phase with the threads 11 tapped in the wall 11'.

The walls of the holder 1 and of the collar 27 are of substantially uniform thickness and, excepting at the thinned corners thereof, the grain structure of the metal of the holder and collar is substantially continuous and unbroken. The holder 1 forms a resilient support for the collar 27 normally maintaining the thread thereof out of phase with the thread 11 of the body 10, but upon screwing home a bolt through the body and against the collar, the holder yields or bends at the corners thereof, under the force of the advancing bolt, until the thread of the bolt meshes with the thread of the collar 27. The resilience of the cup thereupon sets up a recoil or downward pressure on the bolt tending to throw the load carrying surfaces of the threads 11 of the body and the load carrying surfaces of the thread of the bolt into positive contact; thereby preventing loosening of the bolt from the body by vibration, since all axial play between the body and bolt threads is eliminated.

Figs. 12 to 14, inclusive, illustrate the application of my invention to the production of a lock nut having both its body or load bearing element and the holder for its locking collar formed entirely from sheet metal; the metal of the body being thicker than the metal of the holder.

In this embodiment of my invention, a locking element similar to that shown in Figs. 1-3 is welded, in the manner described, to a load bearing body 31 formed of drawn sheet metal and having an apertured base 32, a threaded shank 33 and a head 34 formed by a flange turned outwardly from the shank substantially parallel with the base 32. The shank is of smaller cross section than the base 32 or the head 34 and the head is preferably of smaller diameter than the base.

The utilization of a sheet metal for the load bearing body permits better control of the welding than where a solid body is used, such as shown in Figs. 1 to 11. The use of the sheet metal body requires the use of less current and permits more rapid solidification and cooling of the melt. While the interlocking rib or chamfer previously described may be provided in the sheet metal body and holder, this is not essential if the axial aperture of the disk 4 has a diameter greater than the maximum diameter of the thread 35 in the shank 33 so that the edge of the disk 4 is retracted from the bore of the body to provide a cooling ledge free from pressure during welding.

When a holder and head 34 are pressed together by electrodes 18 and 20, current flows initially through the bottommost points of the ribs 7 so as to initially melt such points and permit cooling of a portion of the melt to provide a seal or bond at this point prior to the melting of the outermost portions of the ribs 7 which melt progressively outwardly toward the periphery of the head 34. Ordinarily the progressive melting of the ribs 7 outwardly from a point of initial contact spaced radially from thread 35 precludes any ingress of molten metal into the thread 35, but it is generally preferable to fill the bore and thread by a threaded non-conducting pilot 19a projecting through the electrode 18 and automatically rotatable through a pinion 25 and gear 26 into close fitting relation with the thread 35, as shown in Fig. 13.

The holder 1 and sheet metal body 31 may be welded together prior to the threading of the shank 33 or the provision of a locking collar in or on the holder 1, and in such case the shank may be sleeved on a smooth surfaced pilot 19 making a close slip fit therewith to preclude flow or spattering of melt into the unthreaded bore of the body.

The construction and positioning of the cup as above described precludes or minimizes the transmission of stresses into the shank 33 as a result of the welding pressure, or as a result of the turning over of the wall 2 of Fig. 14 to form an apertured radial wall or disk 3, or as a result of the staking of such disk, or the staking of the disk 3 of Fig. 14. I thereby avoid the distortion of the shank and threads occurring in the manufacture of sheet metal nuts having an integral drawn cup for supporting a locking collar.

It will be observed that in the embodiment of my invention illustrated in Figs. 12 and 13, the locking collar 5 is spaced axially from the top of the thread 35, hence a bolt screwed through the shank 33 and through the space 36 has at least a portion of its thread projected from the thread 35 before the tip of the bolt reaches and bulges upward the unthreaded fibre collar 5. The spacing of the collar 5 from the thread 35 permits free recoil of the collar 5 after the driving force on the bolt is relaxed, and permits the reconditioning of a nut having a worn collar by tapping the top of the holder to displace the collar 5 downwardly into the space 36. The provision of the space 36 further minimizes capillary action ordinarily drawing moisture between the threaded surfaces of a bolt and nut locked together by a fibre collar.

In the embodiment of my invention illustrated in Figs. 15 and 16, a locking element similar to that illustrated in Figs. 1–3, is welded to a continuous sheet or strip 37 containing apertures surrounded by an upturned lip or rib 38 for positioning a holder 1 prior to welding. Such rib 38 forms a barrier precluding the extrusion of melt into the aperture in the sheet. A series of such locking elements may be welded in any desired pattern to an appropriately apertured and flanged sheet so as to permit the attachment of such sheet to a supporting member 37a by self-tapping standard screws 40 which will be engaged by the edge of or make their own threads in the sheet and will impress threads in the collars 5 and be securely locked thereby.

In the embodiment of my invention illustrated in Figs. 19 to 26, inclusive, a sheet metal strip or disk is cut and drawn to form a holder 41 having a cylindrical peripheral wall 42 and radial walls 43 and 44 extending inward from the peripheral wall 42 at opposite ends thereof to enclose a channel of radially concave cross section in which a laminated hardened fibre collar 45 is seated. Tines or stakes 46 are cut and bent upward from the inner edge of the radial wall or apertured disk 44 and such disk is recessed slightly from the end of the wall 42 so as to form a peripheral rib or bead 47 providing a narrow, shallow welding projection for concentrating current flow and heat remote from the inner edge of the disk 44. The walls 42, 43 and 44 are of substantially uniform thickness except that the thin corners 48 and 49 by which they are connected, and the grain of the metal lies substantially parallel with the surfaces of such walls and is substantially continuous and unbroken.

The cup 41 is adapted for attachment to an anchor nut 50 drawn from heavier sheet metal than the holder 41 and comprising an apertured base 51, a shank 52 having an inner surface forming a thread 52', and a flanged head 53 having a striated or knurled surface 54 forming ribs 55 tapering downwardly from sharp edged tops.

The holder 41 and the body 50 are assembled in superposed relation between flat electrodes 56 and 57. A non-conducting pilot 58 is mounted in the electrode 56 and its lower end is adapted to make a close slip fit with the threaded wall 52' of the shank 52. The pilot preferably has an enlarged upper portion 59 adapted to register with the axial aperture of the collar 45 and forming a shoulder adapted to rest on the top of the head 53. The axial aperture of the collar 45 has an interior diameter intermediate the minimum and maximum diameter of the threaded wall 52' so that when the pilot and shoulder register with the shank and collar, these members are positioned concentrically to one another.

On the passage of welding current between the electrodes 56 and 57, the current is initially concentrated at the points of intersection of the rib 47 with sharp edges of the ribs or striae 55, with consequent concentration of the resultant heat and gradual melting of the contacting welding projections. The striated or knurled surface 54 insures a secure interlocking of the welded members and inhibits or retards flow of melt inward toward the threaded surface 52'.

The inner edge of the disk 44 is spaced outwardly from the top of the thread surface 52' so that a narrow ledge 60 is left on the top of the head 53 between the inner edge of the disk 44 and the shoulder 59 of the pilot. Hence if any molten metal should be extruded by the welding pressure from between the disk 44 and the striated surface 54 in contact therewith, it will solidify on the surface 60 as a rib spaced from the bore of the shank 52 and be excluded from the threaded surface 52'.

Either before or after the welding of the holder 41 to the body 50, the upper surface of the disk 43 may be indented to form stakes 22 complementary to the stakes 46, so that the collar 45 is firmly held against rotation.

These anchor lock nuts are particularly adapted for attachment to a frame member 62 by rivets 63 so as to permit the attachment of a plate 64 to the member 62 by threading a headed bolt 65 through registering apertures in the members 62 and 64 and into the threaded shank 52 and collar 45.

When the tip of the bolt 65 has passed the top of the threaded surface 52', the bolt makes a partial revolution in the free space 60 before engaging the unthreaded surface of the collar 45. As the unthreaded hole in the collar 45 is of smaller diameter than the bolt 65, the continued rotation of the bolt tends to initially bias the collar 45 outward, thereby setting up an axial stress tending to bring and maintain the load carrying sides of the nut and bolt threads into close contact and take up all play or slack between such surfaces. The continued rotation of the bolt finally causes its threads to impress a thread in the fibre collar 45, which imparts some frictional breaking effect of the fibre on the bolt and maintains the axial pressure or stress.

In the embodiment of my invention illustrated in Figs. 27 to 31, inclusive, a sheet metal strip or disk is cut and drawn to form a cup 66 having a peripheral cylindrical wall 67 and a bottom radial wall 68 extending inwardly therefrom and forming a disk containing a central aperture 69 and rectangular apertures 70 between the aperture 69 and the periphery of the disk 68. Indentations 71 are impressed in the inner surface of the disk 68 between the apertures 70 and form welding projections 72 spaced radially from the edge of the aperture 69 and tapering outwardly from the bottom of the disk 68.

As shown in Fig. 28, the cup 66 and a nut body 50 are positioned between flat welding electrodes 73 and 74 similar to the electrodes 56 and 57. A pilot 75 has a lower end shaped to make a close slip fit with the interior of the shank of the body 50 and an enlarged upper portion 76 seated in the electrode 73 and forming a shoulder engaging the top of the body.

On the passage of welding current between the electrodes 73 and 74, the current is concentrated in the tips of the projections 72 contacting the head 53, with consequent generation of heat at these points which gradually melts the welding projections 72. The solidification of the resulting melt welds the disk 68 and head 53 together. Melt extruded from between the surfaces of the disk 68 and head 53 is excluded from the bore of the shank 52 by the pilot, and hence is extruded outwardly toward the periphery of the disks 68 and into the apertures 70. Should any molten metal seep beneath the shoulder formed by the enlarged pilot section 76, it becomes solidified on the ledge between the inner edge of the disk 68 and the edge of the threaded bore of the shank 52.

After the nut body and holder cup have been welded together, there may be seated in the cup the hard fibre collar 77 containing an unthreaded axial aperture 78 having a diameter slightly greater than the minimum and slightly less than the maximum diameter of the threaded wall 52'. The top of the cylindrical wall 67 is then turned over against and indented into the top of the fibre collar 77, as previously described, thereby extruding projections 79 from the collar into the apertures 70, so that the collar is staked at both the top and the bottom thereof. It will, of course, be understood that the collar 77 may be secured in the holder before the welding thereof to the head 53 or that the latter may be striated, as in Fig. 23, if desired.

Figs. 32 to 35, inclusive, illustrate the application of a holder cup 66 to a solid hexagonal nut 80 having a tapped axial bore of smaller maximum diameter than the diameter of the aperture 69. The nut 80 may have a smooth top surface, as indicated in Fig. 34, or a striated top surface 81, as indicated in Figs. 35 and 37. The cup and nut body are centered by the pilot 75 having the enlarged portion 76 forming a shoulder engaging the top of the nut as previously described. The pilot and shoulder not only center the elements but also serve to exclude from the threaded wall 82 any melt resulting from the passage of welding current between the electrodes 73 and 74 through the welding projections 72. Subsequently or prior to the welding together of the cup and body, a fibre collar 77 may be seated and staked in the holder as previously described.

It is preferable that the locking collar be positioned by a holder having apertured radial walls at both ends thereof, but some of the features of my invention may be utilized in the manufacture of a locking nut in which a peripheral cylindrical wall of the collar-holder is welded directly to a nut body as illustrated for example in Figs. 37 to 40, inclusive.

In this embodiment of my invention a nut 80 having a striated surface 81 has welded thereto a sheet metal holder 83 having a cylindrical peripheral wall 84 and a radial wall 85 bent therefrom. A hard fibre locking collar 86 is seated in the holder 83 and locked against rotation by stakes 87. The holder and collar are centered on the nut body by the pilot 75 projecting from a flat electrode 73, and current passing between the electrodes 73 and 74 is concentrated at the points of contact between the peripheral wall 84 and the striated top 82 of the nut body 80. The concentration of current results in localized heating and melting of the edge of the wall 84, which is bonded to the nut body 80 by the solidification of the melt, the metal being prevented from seeping into the bore of the nut by the pilot and the interengagement of the striae on the nut with the bottom of the collar. The striae indent the collar as the elements are forced together by the pressure of the electrodes and the resulting interlock further prevents rotation of the collar.

Having described my invention, I claim:

1. A fastener including a threaded bolt and a locking nut comprising a load carrying member containing an aperture having a wall forming a thread having a load bearing surface, an axially resilient bolt-locking collar for engaging a section of the threaded bolt threaded through said aperture, said member and collar having axially aligned bores, said bolt having a load bearing surface complementary to the aforesaid surface and said collar tending to bias the bearing surfaces of the member and bolt threads into frictional engagement, and means comprising a holder containing a channel of radially concave cross section connecting said collar and member, said channel having a radial wall between said collar and the face of said load carrying member and welded to said member and containing a bolt hole of greater diameter than said thread.

2. A fastener including a threaded bolt and a locking nut comprising a body containing a thread having a load bearing surface, an axially resilient bolt-locking collar for engaging a section of a threaded bolt threaded through said body said body and collar having axially aligned bores, said bolt having a load bearing surface complementary to the aforesaid surface and said collar tending to bias the load bearing surfaces of the member and bolt threads into frictional contact, and a holder connecting said collar and body and comprising a shell containing an annular channel of concave cross section and having a radial wall having its inner edge adjacent to but spaced slightly from the end of said body thread, said radial wall being welded to an end face of said body below and substantially parallel with the plane of the bottom of said collar.

3. A locking nut comprising load carrying means containing an aperture and having a surface substantially normal to the axis thereof and locking means including a radially inturned flange and an axially resilient bolt-locking collar operatively associated with the flange, said flange containing an aperture and having a face normal to the axis thereof and bonded to said first named face, said normal face of one of said means having an annular rib surrounding its aperture and said normal face of the other of said means containing a seat for said rib, said collar having a bore axially aligned with said aperture.

4. A locking nut comprising a load carrying body having a threaded tubular member with outwardly turned flanges at the ends thereof, a locking collar, and a holder connecting said collar and body and comprising a tubular member with inwardly turned flanges at the ends thereof, one of the flanges of said collar lapping, reinforcing, and being bonded to a flange of said tubular member.

5. A locking nut comprising a plurality of tubular members each having flanges at both ends thereof, a flange of one member being bonded to a flange of the other member, the inner edges of said bonded flanges being radially spaced from one another, one of said tubular members being threaded and the other of said members supporting a locking collar.

6. A locking nut comprising a load bearing element containing an aperture having a wall forming a load bearing thread, a locking collar containing an aperture having a threaded wall said apertures being coaxial, and a holder integral with said collar and connecting it with said element and comprising a shell of concave cross section and including a radial wall bonded to said element with its inner edge radially spaced from said load bearing thread.

7. In the manufacture of locking nuts the steps which comprise aligning a load bearing member and a locking member with radially disposed tapering members between them, and fusing said last named members from their inner ends outwardly.

8. In the manufacture of locking nuts, the steps which comprise aligning a load bearing member and a locking member with tapering fusible members between them, and fusing said tapered members from their thinner ends toward their bases.

9. In the manufacture of locking nuts the steps which comprise indenting the inturned base of a shell to form projections thereon, aligning said shell with a load bearing member with the projections between said members, fusing said projections, and forcing a portion of the melt into said shell to form collar stops therein, and pressing a collar against said stops.

KLAS ARENT SWANSTROM.

REFERENCES CITED

The following references are of record in the file of this patent:

UNITED STATES PATENTS

| Number | Name | Date |
| --- | --- | --- |
| 154,851 | Dittman | Sept. 8, 1874 |
| 189,984 | Wright | Apr. 24, 1877 |
| 898,003 | Posson | Sept. 8, 1908 |
| 1,176,621 | Thomshaw | Mar. 21, 1916 |
| 1,220,773 | Murray | Mar. 27, 1917 |
| 1,550,282 | Rennerfelt | Aug. 18, 1925 |
| 1,604,531 | Murray | Oct. 26, 1926 |
| 1,665,851 | Harris | Apr. 10, 1928 |
| 1,670,131 | Allerton | May 15, 1928 |
| 1,990,718 | Swanstrom | Feb. 12, 1935 |
| 2,007,293 | Cayoutte | July 9, 1935 |
| 2,054,187 | Almdale | Sept. 15, 1936 |
| 2,054,965 | Cio | Sept. 22, 1936 |
| 2,069,008 | Howard | Jan. 26, 1937 |
| 2,102,489 | Simmonds | Dec. 14, 1937 |
| 2,112,594 | Double | Mar. 29, 1938 |
| 2,247,278 | Daisley | June 4, 1941 |
| 2,265,661 | Luce | Dec. 9, 1941 |
| 2,279,574 | Langmaid | Apr. 14, 1942 |
| 2,286,667 | Brooke | June 16, 1942 |
| 2,286,668 | Brooke | June 16, 1942 |
| 2,287,540 | Vang | June 23, 1942 |
| 2,300,619 | Double | Nov. 3, 1942 |
| 2,320,032 | Danforth | May 25, 1943 |
| 2,318,398 | Hungerford | May 4, 1943 |
| 2,321,201 | Heilman | June 8, 1943 |
| 2,321,497 | Luce | June 8, 1943 |
| 2,328,706 | Bracket | Sept. 7, 1943 |
| 2,333,388 | Poupitch | Nov. 2, 1943 |
| 2,336,023 | Luce | Dec. 7, 1943 |
| 2,360,660 | Eaton et al. | Oct. 17, 1944 |
| 2,391,989 | Luce | Jan. 1, 1946 |

FOREIGN PATENTS

| Number | Country | Date |
| --- | --- | --- |
| 228,505 | Great Britain | Feb. 19, 1925 |
| 461,638 | Great Britain | Feb. 22, 1937 |